United States Patent
Ishizaki et al.

(10) Patent No.: US 11,031,832 B2
(45) Date of Patent: Jun. 8, 2021

(54) STATOR OF ROTATING ELECTRICAL MACHINE AND METHOD OF MANUFACTURING STATOR OF ROTATING ELECTRICAL MACHINE

(71) Applicants: KABUSHIKI KAISHA TOSHIBA, Minato-ku (JP); Toshiba Energy Systems & Solutions Corporation, Kawasaki (JP)

(72) Inventors: Shunsuke Ishizaki, Yokohama (JP); Ken Nagakura, Ebina (JP); Yuichiro Gunji, Yokohama (JP); Norio Takahashi, Yokohama (JP); Masahiro Seki, Yokohama (JP)

(73) Assignees: KABUSHIKI KAISHA TOSHIBA, Minato-ku (JP); Toshiba Energy Systems & Solutions Corporation, Kawasaki (JP)

( * ) Notice: Subject to any disclaimer, the term of this patent is extended or adjusted under 35 U.S.C. 154(b) by 86 days.

(21) Appl. No.: 16/377,832

(22) Filed: Apr. 8, 2019

(65) Prior Publication Data
US 2019/0312472 A1 Oct. 10, 2019

(30) Foreign Application Priority Data
Apr. 10, 2018 (JP) .............................. JP2018-075434

(51) Int. Cl.
*H02K 1/20* (2006.01)
*H02K 1/18* (2006.01)

(52) U.S. Cl.
CPC ............... *H02K 1/20* (2013.01); *H02K 1/185* (2013.01)

(58) Field of Classification Search
CPC .. H02K 1/32; H02K 9/02; H02K 1/20; H02K 2201/03; H02K 2201/15; H02K 3/24;
(Continued)

(56) References Cited

U.S. PATENT DOCUMENTS 3,171,996 A * 3/1965 Alger ....................... H02K 1/20
310/51
4,542,313 A * 9/1985 Di Pietro ................. H02K 1/20
310/65
(Continued)

FOREIGN PATENT DOCUMENTS

| JP | 56-071439 | | 6/1981 |
| JP | S 6173529 | * | 4/1986 |

(Continued)

*Primary Examiner* — Ahmed Elnakib
(74) *Attorney, Agent, or Firm* — Oblon, McClelland, Maier & Neustadt, L.L.P.

(57) ABSTRACT

According to one embodiment, a stator includes spacing strips disposed to be interposed in the electromagnetic steel plates for each predetermined set of plates of the electromagnetic steel plates, each of the spacing strips extending in a radial direction of the stator iron core to form ventilation ducts, a spacing strip attachment plate which is disposed between the spacing strips and the set of plates of the electromagnetic steel plates to fix the spacing strips, and an insulating layer which covers the entirety of the spacing strip attachment plate and the spacing strips fixed to the spacing strip attachment plate.

10 Claims, 3 Drawing Sheets

(58) Field of Classification Search
CPC .. H02K 5/20; H02K 9/16; H02K 9/25; H02K 7/18; H02K 7/183; F03D 9/25; F03D 80/60; Y02E 10/725
USPC ........ 310/216.004, 216.076, 216.115, 254.1, 310/52, 57, 58, 59, 60 R, 61, 62, 60 A, 65
See application file for complete search history.

(56) References Cited

U.S. PATENT DOCUMENTS

| | | |
|---|---|---|
| 2003/0048030 A1 | 3/2003 | Griffith et al. |
| 2011/0140582 A1* | 6/2011 | Nakahara ................ H02K 1/20 310/60 A |

FOREIGN PATENT DOCUMENTS

| | | |
|---|---|---|
| JP | 4468856 | 5/2010 |
| WO | WO 2018/047839 A1 | 3/2018 |

* cited by examiner

STATOR OF ROTATING ELECTRICAL MACHINE AND METHOD OF MANUFACTURING STATOR OF ROTATING ELECTRICAL MACHINE

CROSS-REFERENCE TO RELATED APPLICATIONS

This application is based upon and claims the benefit of priority from Japanese Patent Application No. 2018-075434, filed Apr. 10, 2018, the entire contents of which are incorporated herein by reference.

FIELD

Embodiments described herein relate generally to a stator of a rotating electrical machine and a method of manufacturing a stator of a rotating electrical machine.

BACKGROUND

In a large-scale rotating electrical machine, such as a turbine power generator and an electric motor, generally, an iron core of a stator has a wall-thick cylindrical shape having a stator coil groove at its inner diameter portion, and the iron core is formed by laminating an electromagnetic steel plate, so-called a punched plate, in which each of laminated thin silicon steel plates is punched out in a fan shape. In the process of laminating the punched plate, spacers (spacing strips) are provided at such intervals that the punched plate has an appropriate thickness, thereby ventilation ducts for a refrigerant gas in the machine are formed in its radial direction. In an inner circumferential portion of a stator frame, the laminated punched plates are integrated into one body by attaching the laminated punched plates to keybars, which are arranged on the circumference, for example, to be equally spaced, and clamping and fixing the punched plate using a discotic ring-shaped pressure board.

In recent years, renewable energy, which involves large output variations, is supplied to an electric power system, and variations in frequency and voltage of the electric power system have increased. To handle the variations, there is a demand for increasing the operating range of a rotating electrical machine to be connected to an electric power system. In the case of increasing the operating range, if the frequency is low and the voltage is high, the rotating electrical machine tends to be in an overexcited state.

In a stator iron core of a rotating electrical machine having the above-mentioned configuration, an electric current flows to keybars due to a magnetic flux that has leaked on the outer circumferential side of the stator iron core, and in an overexcited state, the amount of the leaked magnetic flux is increased, which also leads to an increase in the amount of electric current flowing to the keybars.

If an electric current flows to the keybars, the electric current has the potential to also flow to an adjacent iron core as well as to structures which are present in the iron core. Furthermore, if an insulating layer on the inner circumferential side surface of the punched plates is damaged, a short-circuit occurs between the punched plates, and particularly when the number of plates of damaged punched plates is large, cyclic electric currents are likely to flow to the punched plates.

If a large electric current flows to the structures or punched plates due to over-excitation, large damage may occur due a local concentration of the electric current. Therefore, there is a need to prevent an electric current from flowing into an iron core adjacent to the keybars and the structures which are present in the iron core in some way or other to thereby prevent the stator iron core from being damaged.

For the reasons described above, a technique is desired which enables blocking off an unfavorable electric current which is generated at a stator of a rotating electrical machine during operation, such as an electric current flowing between adjacent keybars caused by a magnetic flux leaked on the outer circumferential side of the stator iron core.

DETAILED DESCRIPTION

In general, according to one embodiment, there is provided a stator of a rotating electrical machine, comprising: electromagnetic steel plates which are laminated in an axial direction of a stator iron core to form the stator iron core; spacing strips which are disposed to be interposed in the electromagnetic steel plates for each predetermined set of plates of the electromagnetic steel plates, each of the spacing strips extending in a radial direction of the stator iron core to form ventilation ducts; a spacing strip attachment plate which is disposed between the spacing strips and the set of plates of the electromagnetic steel plates to fix the spacing strips; and an insulating layer which covers the entirety of the spacing strip attachment plate and the spacing strips fixed to the spacing strip attachment plate.

Hereinafter, embodiments of a stator of a rotating electrical machine will be described in detail with reference to drawings.

First Embodiment

A stator of a rotating electrical machine according to a first embodiment will be described using FIGS. 1 to 3.

Figure 1:
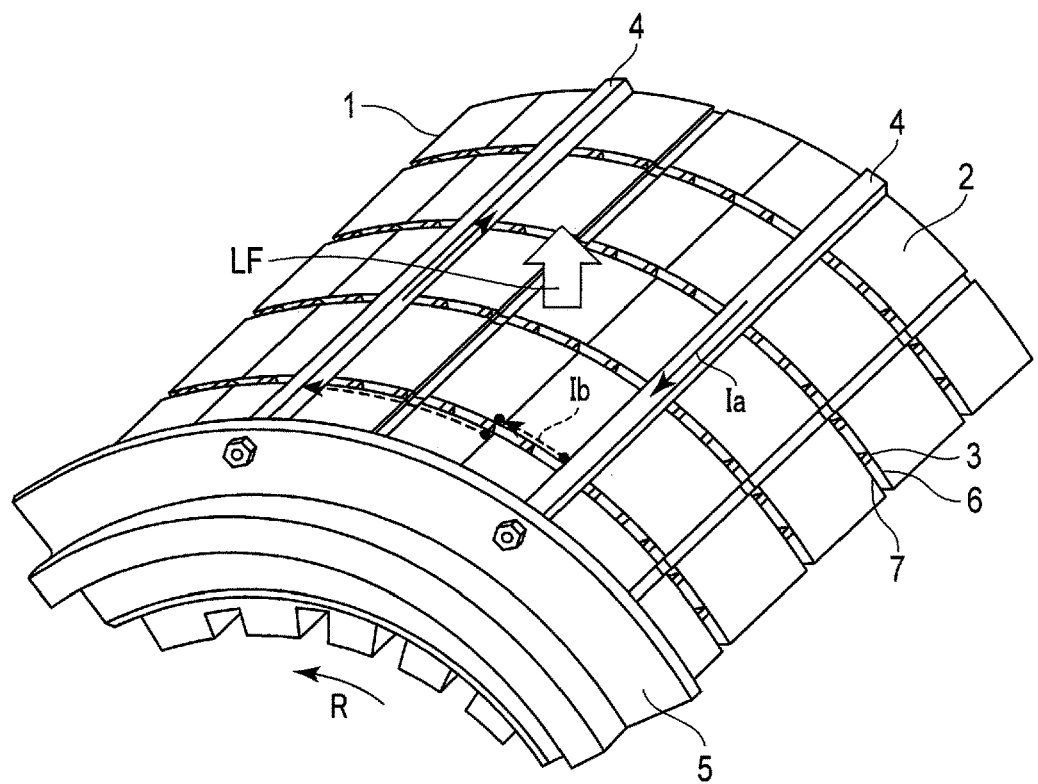
FIG. 1 is a perspective view partially showing the configuration of a stator iron core according to a first embodiment.

FIG. 1 is a perspective view partially showing the configuration of a stator iron core. In FIG. 1, a stator iron core 1 includes, as main structural elements, directional electromagnetic steel plates 2, in which thin silicon steel plates that are punched in a substantially fan shape (hereinafter, referred to as "punched plates") are laminated.

The punched plates 2 are formed into a block along a stator axial direction by arranging a spacing strip attachment plate 6 to which a spacing strip 3 is fixed and a spacing plate 7 of a non-directional electromagnetic steel plate that faces the spacing strip attachment plate 6 with the spacing strip 3 interposed therebetween so that the spacing strip attachment plate 6 and the spacing plate 7 are interposed in the punched plates 2 for each predetermined set of laminated plates of the punched plates 2. A space in the radial direction of the iron core formed by the spacing strips 3 serves as a ventilation duct of airflow accompanied by heat generated when a rotor, which is not illustrated in the present embodiment, rotates, for example, as shown by an arrow R in the figure.

The punched plate 2 has an integrated configuration in which keybars 4 are mounted on the outer circumferential surface of the punched plate 2 such that the keybars 4 are arranged to extend in the axial direction of the stator and to be apart from one another, for example, at equal intervals on the circumference, and the punched plate 2 is clamped and fixed along the axial direction of the iron core by a discotic ring-shaped pressure board 5 which is provided at both ends (one end in FIG. 1) of the stator iron core 1 in the axial direction thereof.

Figure 2:
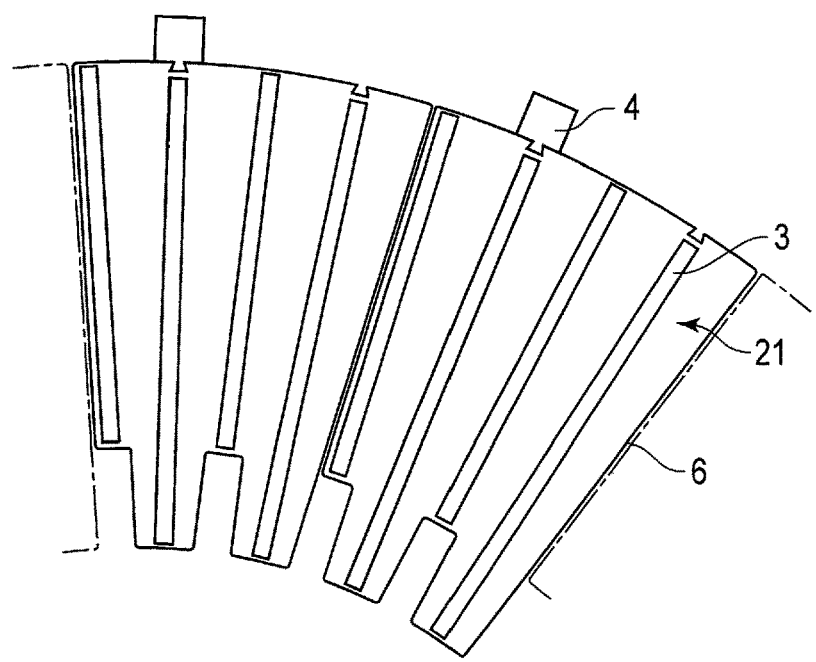
FIG. 2 is a view showing a relation between keybars and a spacing strip attachment plate to which a spacing strip according to the first embodiment shown in FIG. 1 is fixed.

FIG. 2 shows a relation between the keybars 4 and the spacing strip attachment plate 6 to which the spacing strip 3 is fixed. The spacing strip 3 is fixed to the spacing strip attachment plate 6 by dotting a plurality of points from the rear surface side of the spacing strip attachment plate 6 along the axial direction, for example, by spot welding. The spacing strip attachment plate 6 has, on the inner circumferential side thereof, concaves for coil windings, and the spacing strips 3 have different lengths in conformity with the concaves.

The keybars 4 are engaged with dovetail grooves, which are provided on the outer circumferential side of the punched plates 2 arranged in a laminate and which have a substantially similar shape in the spacing strip attachment plate 6 and in a surface of the spacing strip attachment plate 6 perpendicular to the iron core axial direction.

Figure 3:
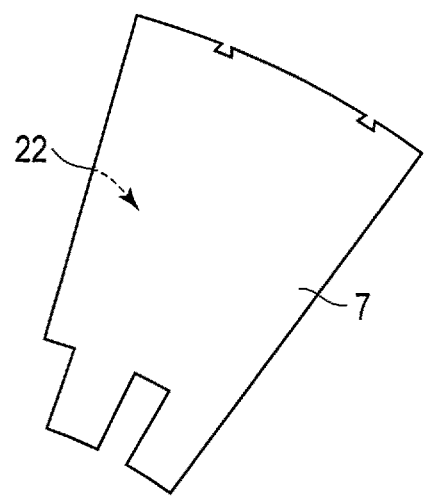
FIG. 3 is a view showing the shape of a spacing plate according to the first embodiment shown in FIG. 1.

FIG. 3 shows a shape of the spacing plate 7 that faces the spacing strip attachment plate 6 with the spacing strip 3 interposed therebetween. The shape itself of the spacing plate 7 is the same as that of the punched plate 2 on a surface perpendicular to the iron core axial direction.

In the configuration of the stator iron core 1 as described above, if a leaked magnetic flux LF that advances toward the outside in the radial direction of the stator iron core 1 occurs, an electric current Ia, which is an original flow, is induced to the keybars 4 as shown in FIG. 1.

At that time, if the periphery of the stator iron core 1 including the spacing strips 3 is not insulated, a flow of an electric current Ib, which is unfavorable under normal conditions, occurs through the spacing strip attachment plate 6, spacing strip 3, and spacing plate 7 which are respectively formed of a nonmagnetic material to the keybars 4, as shown in FIG. 1.

Therefore, in the present embodiment, in order to block off an electric current flowing from a keybar 4 to adjacent keybars 4, the entire surfaces of the spacing strip 3, the spacing strip attachment plate 6 to which the spacing strip 3 is fixed, and the spacing plate 7 whose surface faces the spacing strip attachment plate 6 with the spacing strip 3 interposed therebetween are subjected to insulation by applying a varnish of a heat resistance class F type (155°) or higher, thereby preventing damage to the stator iron core 1.

That is, in the present embodiment, after the spacing strip 3 is fixed to the spacing strip attachment plate 6, a varnish, for example, of a class F type or higher, is applied to the entire surface of the spacing strip 3 and the spacing strip attachment plate 6, so that an insulating layer 21 (See FIG. 2) is provided which covers the entirety of the spacing strip attachment plate 6 and the spacing strip 3 fixed to the spacing strip attachment plate 6. Furthermore, a similar insulating layer 22 (See FIG. 3) is provided also to the entire surface of the spacing plate 7 whose surface faces the spacing strip attachment 6. With this configuration, the spacing strip 3 fixed to the spacing strip attachment plate 6 is insulated from the spacing plate 7.

By subjecting the spacing strip 3, the spacing strip attachment plate 6 to which the spacing strip 3 is fixed, and the spacing plate 7 to the insulation treatment as described above and then assembling the stator iron core 1 as shown in FIG. 1, it is possible to assuredly block off a flow of the electric current Ib passing from a keybar 4 to adjacent keybars 4 in accordance with a leaked magnetic flux LF.

In this respect, the spacing strip 3 is to be integrally subjected to the insulation treatment from a state where the spacing strip 3 is fixed to the spacing strip attachment plate 6, for example, by spot welding. With this, it is possible to perform the work for fixation by welding without causing insulation breakdown in an insulation film as well as to assuredly form an insulation film, by posterior varnish coating, on the entire surfaces of the spacing strip 3 and the spacing strip attachment plate 6 to which the spacing strip 3 has been fixed.

In the insulation using a varnish, the varnish may be partially applied to the surfaces including especially a surface in which the spacing strip 3 and the spacing plate 7 are contacted, a surface in which the spacing strip 3 and the punched plate 2 are contacted, and a surface in which the spacing plate 7 and the punched plate 2 are contacted, instead of the case of forming an insulation film by applying a varnish to respective entire surfaces of the spacing plate 7 and the spacing strip attachment plate 6 to which the spacing strip 3 has been fixed.

By subjecting the surfaces of the constituent members to a partial insulation treatment including such insulation-necessary portions, it is possible to assuredly block off a flow of the electric current Ib, which passes from a keybar 4 to adjacent keybars 4 in accordance with a leaked magnetic flux LF, while appropriately reducing the labor and the workability when manufacturing the stator iron core 1.

Second Embodiment

A stator of a rotating electrical machine according to a second embodiment will be described using FIGS. 1 to 3.

The same reference numerals are provided to the same constituent members as those in the first embodiment, and the explanation thereof will be omitted based on the assumption that the basic configuration of the entirety of the stator iron core 1 is the same as that described in the first embodiment.

In the second embodiment, a sheet shaped insulator is used, instead of the insulation configuration in which a varnish is applied to form an insulation film in the first embodiment.

In this case, a sheet shaped insulator is provided on a surface on the spacing strip 3 side which is, in contact with a spacing plate 7, so that the spacing strip 3 and a punched plate 2 which is positioned with the spacing plate 7 interposed therebetween are insulated by the sheet shaped insulator.

In addition to the above, the sheet shaped insulator may be provided also to a surface of the spacing plate 7 which is in contact with the spacing strip 3 to thereby perform the insulation between the spacing strip 3 and the punched plate 2 which is positioned with the spacing plate 7 interposed therebetween in a more assured manner.

By providing insulation to the spacing strip 3 using a sheet shaped insulator in this way, it is possible to provide assured insulation to the stator iron core 1 while drastically simplifying the labor required for insulation when manufacturing the stator iron core 1.

Third Embodiment

A stator of a rotating electrical machine according to a third embodiment will be described using FIG. 4.

The same reference numerals are provided to the same constituent members as those in the first embodiment, and the explanation thereof will be omitted based on the assumption that the basic configuration of the entirety of the stator iron core 1 in FIGS. 1 to 3 is the same as that described in the first and second embodiments.

Figure 4:
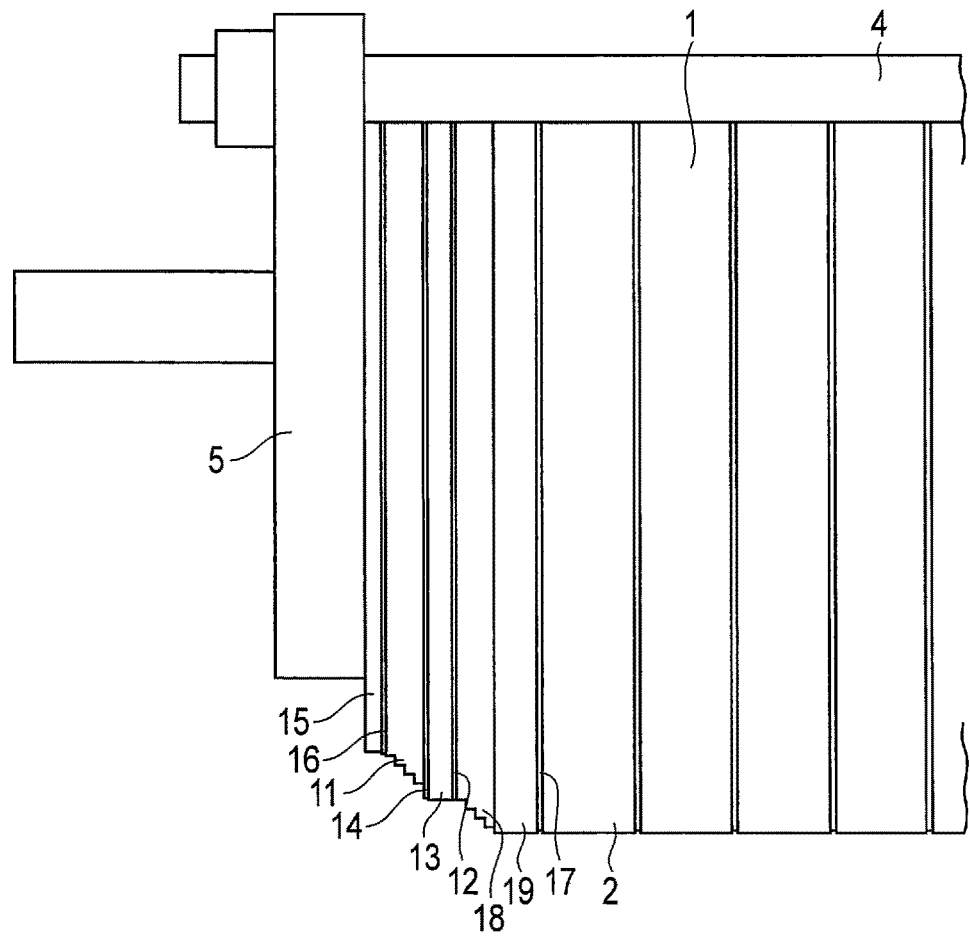
FIG. 4 is a partially schematic cross-sectional view of an end of a stator iron core according to a third embodiment in an axial direction.

FIG. 4 is a schematic partial cross-sectional view showing an end of the stator iron core 1 in its axial direction and particularly illustrates a cross-sectional configuration of an iron core end which is particularly a portion where a magnetic flux shunt 11 and an end step drop section 18 are provided.

In an ultra-large turbine power generator, particularly, at an end thereof in its axial direction where the density of a magnetic flux increases, there are provided a magnetic flux shunt 11 for reducing a magnetic flux in the axial direction that enters the end of the iron core and an end step drop section 18 for increasing the magnetic resistance by increasing the inner diameter of a punched plate disposed closer to the end to thereby decrease the magnetic flux density.

The magnetic flux shunt 11 provided for the purpose of reducing a magnetic flux in the axial direction that mainly enters the iron core end does not have a role as a magnetic circuit, whereas the end step drop section 18 is a part of the stator iron core 1 and has a role as a magnetic circuit.

In the present embodiment, a portion of the stator iron core 1 on the side of a pressure board 5 including a portion in which the magnetic flux shunt 11 and the end step drop section 18 are placed is referred to as an iron core end.

The stator iron core 1 has, at its end, a configuration which is provided with, in the order as viewed from the end direction on the left side in FIG. 4, a pressure board 5, a spacing strip 15 on the outer side of a magnetic flux shunt, a spacing strip attachment plate 16 on the outer side of a magnetic flux shunt, a magnetic shunt 11, a spacing plate 14 made of a stainless steel plate, a spacing strip 13 on the outer side of the iron core, a spacing strip attachment plate 12 on the outer side of the iron core, an end step drop section 18, and a spacing plate 19, and thereafter an iron core inner side spacing strip 17 and a punched plate 2 are alternately arranged.

Although the illustration is omitted herein, the iron core inner side spacing strip 17 is provided as a configuration where the iron core inner side spacing strip 17 is fixed to the spacing strip attachment plate 6 as shown in FIG. 2, the spacing strip attachment plate 6 is placed in contact with the punched plate 2, and the spacing plate 7 shown in FIG. 3 is disposed on the opposite side of the spacing strip attachment plate 6 with the iron core inner side spacing strip 17 being interposed therebetween, excluding the portion of the spacing plate 19.

The magnetic flux shunt 11 has a laminated configuration of punched plates made of the electromagnetic steel plates so that the outer circumferential end position of the magnetic flux shunt 11 is placed at the same position as the outer circumferential end position of the iron core which is in contact with the keybar 4 as illustrated in FIG. 4, and the width thereof in the iron core radius direction decreases toward the left side end in the figure, and the magnetic flux shunt 11 has an oblique plane with multi-steps on the inner circumferential side of the iron core.

Similarly, since the end step drop section 18 is disposed separate from the end of the magnetic flux shunt 11 in the iron core axial direction, the end step drop section 18 has also a laminated configuration of punched plates made of electromagnetic steel plates so that the width thereof in the iron core radius direction is, as a whole, greater than that of the magnetic flux shunt 11 (in other words, the inner diameter of the punched plates is smaller than that of the magnetic flux shunt 11), while a portion thereof closer to the end in the iron core axial direction becomes smaller in width in the iron core radius direction (in other words, the inner diameter of punched plates closer to the end becomes greater) and forms an oblique surface with multi-steps on the inner circumferential side of the iron core. The punched plates of electromagnetic steel plates for use in the end step drop section 18 may be made of the same material as the punched plates of electromagnetic steel plates for use in the magnetic flux shunt 11.

As illustrated in FIG. 4, in the present embodiment, the iron core outer side spacing strip 13 forming a ventilation duct for cooling the iron core end is set to have a greater size in the iron core axial direction than the iron core inner side spacing strip 17 forming a ventilation duct for cooling the stator iron core 1 placed more inside than the iron core end.

In the configuration described above, in order to block off an electric current that flows from a keybar 4 and passes to adjacent keybars 4 in accordance with a leaked magnetic flux LF, the iron core outer side spacing strip 13, a spacing plate 14 made of a stainless steel plate, a spacing strip attachment plate 12 on the outer side of the iron core, and a spacing plate 19 are subjected to insulation treatment in which a varnish of a heat resistance class F type or higher is applied to them respectively to thereby form an insulation film.

In this case, the iron core outer side spacing strip 13, the spacing plate 14 made of a stainless steel plate, the spacing strip attachment plate 12 on the iron core outer side, and the spacing plate 19 may be subjected to insulation treatment so that a portion including surfaces thereof that are contacted with each other is partially insulated, or the surfaces thereof are entirely insulated.

In a stator iron core adopted, particularly, in an ultra-large turbine power generator, etc. in which the magnetic flux density increases, it is possible to more assuredly block off an electric current flowing from a keybar 4 from passing to adjacent keybars 4 by providing a magnetic flux shunt 11 for reducing a magnetic flux in the axial direction that enters an iron core end of a stator at both ends thereof in its axial direction and providing more robust insulation treatment thereto. Even when an end step drop section 18 for increasing the magnetic resistance and decreasing the magnetic density is further provided to the iron core end, the same effect can be exhibited.

Fourth Embodiment

A stator of a rotating electrical machine according to a fourth embodiment will be described using FIG. 4.

The configuration of a stator iron core on its end side, including a magnetic flux shunt 11 and an end step drop section 18, is basically the same as that illustrated in FIG. 4. The same reference numerals are provided to the same constituent members, and explanations thereof are omitted.

In the fourth embodiment, a sheet shaped insulator is used instead of the insulation configuration forming an insulation film by applying a varnish in the third embodiment.

In this case, a space between a spacing strip 3 and a punched plate 2 positioned with a spacing plate 7 interposed therebetween is insulated by providing a sheet shaped insulator on a surface between a spacing plate 14 made of a stainless steel plate and an iron core outer side spacing strip 13, a surface between an end step drop section 18 and an iron core outer side spacing strip attachment plate 12 to which the iron core outer side spacing strip 13 is attached, and a surface between the end step drop section 18 and a spacing plate 19, respectively.

By subjecting the constituent members to insulation using a sheet shaped insulator, centering on the iron core outer side spacing strip 13 in this way, it is possible to drastically simplify the labor required for insulation when manufacturing a stator iron core 1 and to provide an assured insulation treatment.

Fifth Embodiment

A stator of a rotating electrical machine according to a fifth embodiment will be described using FIGS. 5A and 5B.

The same reference numerals are provided to the same constituent members, and explanations thereof are omitted, based on the assumption that the configuration of the fifth embodiment is basically the same as that shown in FIGS. 1 to 3.

Figure 5A:
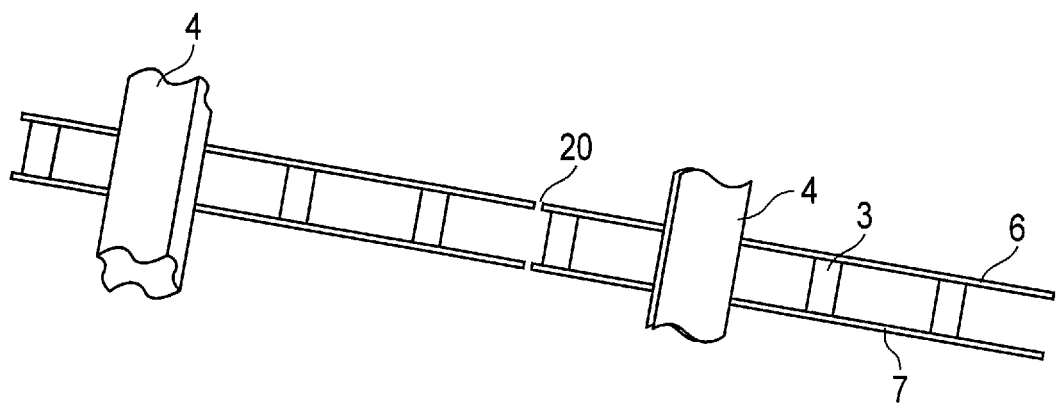
FIGS. 5A and 5B are views each showing a configuration of a spacing strip attachment plate to which a spacing strip is fixed, a spacing plate that faces the spacing strip attachment plate with the spacing strip interposed therebetween, and keybars, as viewed from the outer circumferential surface side of a stator iron core according to a fifth embodiment.

FIG. 5A shows a configuration of a spacing strip attachment plate 6 to which a spacing strip 3 is fixed, a configuration of a spacing plate 7 that faces the spacing strip attachment plate 6 with the spacing strip 3 interposed therebetween, and a configuration of a keybar 4 as viewed from the outer circumferential side of a stator iron core 1 according to the present embodiment. As shown in the same figure, both the spacing strip attachment plate 6 and the spacing plate 7 respectively have a substantially fan shape, and the same configuration as that of the stator iron core 1 along a surface thereof perpendicular to the axial direction of the stator iron core 1 is placed adjacent to the configuration of the stator iron core 1 via a gap 20, so that the spacing strip attachment plate 6 and the spacing plate 7 are formed into a disc ring shape.

In this embodiment, each gap 20 between spacing strip attachment plates 6 is made so as to conform to the position of each gap between the spacing plates 7 at positions in the circumferential direction as illustrated in FIG. 5A.

Figure 5B:
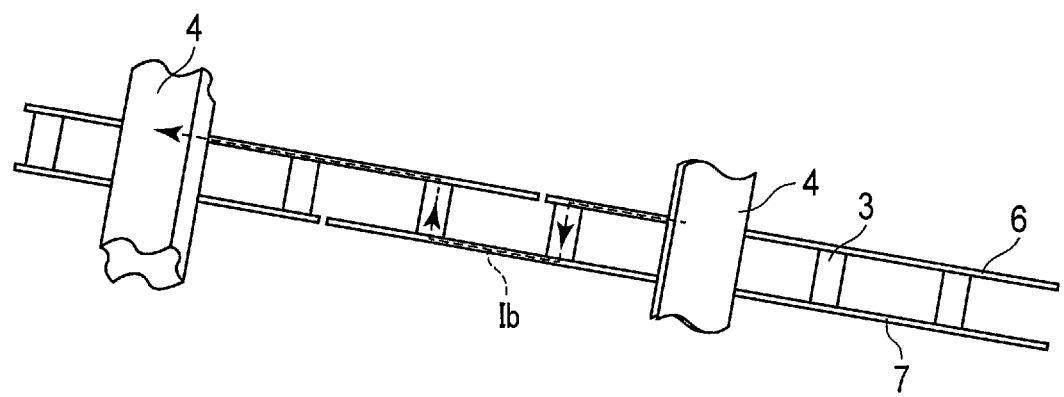

In contrast, FIG. 5B is a view illustrating, as a reference, a positional relation between a spacing plate 7 and a spacing strip attachment plate 6 to which a spacing strip 3 is fixed, which has been conventionally and commonly used. As shown in FIG. 5B, in the conventional common configuration, the spacing strip attachment plates 6 and the spacing plates 7 are arranged so that the position of each gap of the spacing strip attachment plates 6 differs from the position of each gap of the spacing plates 7. Therefore, an electric current generated at a keybar 4 due to a leaked magnetic flux LF flows to a spacing strip attachment plate 6, a spacing strip 3, a spacing plate 7, a spacing strip 3, a spacing strip attachment plate 6, and so on as shown in FIG. 5B and reaches an adjacent keybar 4 as shown by an electric current Ib in FIG. 5B.

With the configuration of the present embodiment shown in FIG. 5A, it is possible to prevent the stator iron core 1 being damaged, in particular, without using a vanish or a sheet shaped insulator, by conforming the position of each gap 20 between the spacing strip attachment plate 6 and the spacing plate 7 in the circumferential direction, so that the stator iron core 1 has a spatially insulated configuration.

Sixth Embodiment

Hereinafter, a stator of a rotating electrical machine according to a sixth embodiment will be described.

The first to the fifth embodiments have been described, in which the spacing strip 3, the spacing strip attachment plate 6 to which the spacing strip is fixed, and the spacing plate 7, which constitute the stator iron core 1, are all subjected to insulation treatment.

The leaked magnetic flux LF exponentially increases (has higher density) with proximity to the end side of the stator iron core 1 along the axial direction thereof, and therefore only a portion of the stator iron core 1 on the axial direction end side, e.g., the spacing strip 3, spacing strip attachment plate 6 and spacing plate 7, respectively for three to five steps from both ends of the stator iron core 1, may be subjected to the above-mentioned insulation treatment, according to the scale and the specification of the stator iron core 1, while omitting the insulation treatment to a center side portion of the stator iron core 1 in the axial direction where a leaked magnetic flux Lf is comparatively small.

That is, in the present embodiment, among a plurality of the spacing strips 3 and a plurality of the spacing strip attachment plates 6 provided in plural number in the axial direction, a spacing strip 3, a spacing strip attachment plate 6, and a spacing plate 7 provided at a second position (e.g., any position of the sixth step or subsequent steps from the end) which is closer to a center of the stator iron core 1 in the axial direction than a first position (e.g., any three to five steps from the end) which is closer to an end of the stator iron core 1 in the axial direction are not subjected to insulation treatment, and an insulating layer is not provided.

On the other hand, with respect to the spacing strip 3 and spacing strip attachment plate 6 provided at the first position, similarly to the first to fifth embodiments, the spacing strip 3, the spacing strip attachment plate 6 to which the spacing strip 3 is fixed, and the spacing plate 7 are subjected to insulation treatment, so that an insulation layer 21 is provided which covers the entirety of the spacing strip attachment plate 6 and the spacing strip 3 fixed to the spacing strip attachment strip 6, and a similar insulation layer 22 is provided also on the entire surface of a spacing plate 7 whose surface faces the spacing strip attachment plate 6, thereby the spacing strip 3 fixed to the spacing strip attachment plate 6 and the spacing plate 7 are insulated.

As described above, the embodiments can contribute to an improvement in cost-effectiveness, especially relating to the manufacturing cost.

The embodiments described above are not intended to limit the type of a rotating electrical machine, a driving method, etc., irrespective of a power generator or an electric motor.

As described in detail above, according to each of the embodiments, it is possible to block off an unfavorable electric current caused in a stator of a rotating electrical machine, such as an electric current flowing between adjacent keybars caused by a magnetic flux leaked out from the outer side of the stator iron core.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made. The accompanying claims and their equivalents are intended to cover such forms or modifications as would fall within the scope of the inventions.

The invention claimed is:

1. A stator of a rotating electrical machine, comprising:
electromagnetic steel plates which are laminated in an axial direction of a stator iron core to form the stator iron core;
spacing strips which are disposed to be interposed in the electromagnetic steel plates for each predetermined set of plates of the electromagnetic steel plates, each of the spacing strips extending in a radial direction of the stator iron core to form ventilation ducts;
a spacing strip attachment plate which is disposed between the spacing strips and the set of plates of the electromagnetic steel plates to fix the spacing strips; and
an insulating layer which covers an entirety of exposed surfaces of the spacing attachment plate and the spacing strips fixed to the spacing strip attachment plate, wherein:
the spacing strips and the spacing strip attachment plate are provided at a first position which is closer to an end of the stator iron core in the axial direction and at a second position which is closer to a center of the stator iron core in the axial direction than the first position, and
the insulating layer is provided on the spacing strips and the spacing strip attachment plate in the first position, and the spacing strips and the spacing strip attachment plate in the second position are not provided with the insulating layer.

2. The stator of the rotating electrical machine as claimed in claim 1, further comprising:
a magnetic flux shunt provided at both ends of the stator iron core in the axial direction, the magnetic flux shunt being formed of a laminated layer of electromagnetic steel plates and a width thereof in the radial direction decreasing toward each end of the stator iron core.

3. The stator of the rotating electrical machine as claimed in claim 1, further comprising:
keybars which are arranged to extend in the axial direction of the stator iron core and to be apart from one another on a circumference of an outer circumferential surface of the stator iron core; and
a ring-shaped pressure board which is mounted on both ends of the keybars and fixes the keybars.

4. A rotating electrical machine comprising:
a rotor and the stator of the rotating electrical machine as claimed in claim 1.

5. A stator of a rotating electrical machine, comprising:
electromagnetic steel plates which are laminated in an axial direction of a stator iron core to form the stator iron core;
spacing strips which are disposed to be interposed in the electromagnetic steel plates for each predetermined set of plates of the electromagnetic steel plates, each of the spacing strips extending in a radial direction of the stator iron core to form ventilation ducts;
a spacing strip attachment plate which is disposed between the spacing strips and the set of plates of the electromagnetic steel plates to fix the spacing strips;
an insulating layer which covers an entirety of exposed surfaces of the spacing attachment plate and the spacing strips fixed to the spacing strip attachment plate; and
a spacing plate interposed between an opposite surface to a surface of the spacing strips that is fixed to the spacing strip attachment plate and the set of plates of the electromagnetic steel plates to insulate the spacing strips and the spacing plate,
wherein the spacing strip attachment plate and the spacing plate are respectively arranged in plural in a circumferential direction via gaps, and positions of both of the gaps of the spacing strip attachment plate and the spacing plate, which face to each other with the spacing strip interposed therebetween, conform to one another in the circumferential direction.

6. The stator of the rotating electrical machine as claimed in claim 5, further comprising:
an insulating layer which insulates the spacing strips and the spacing plate.

7. The stator of the rotating electrical machine as claimed in claim 5, further comprising:
a magnetic flux shunt provided at both ends of the stator iron core in the axial direction, the magnetic flux shunt being formed of a laminated layer of electromagnetic steel plates and a width thereof in the radial direction decreasing toward each end of the stator iron core.

8. The stator of the rotating electrical machine as claimed in claim 5, further comprising:
keybars which are arranged to extend in the axial direction of the stator iron core and to be apart from one another on a circumference of an outer circumferential surface of the stator iron core; and
a ring-shaped pressure board which is mounted on both ends of the keybars and fixes the keybars.

9. A rotating electrical machine comprising:
a rotor and the stator of the rotating electrical machine as claimed in claim 5.

10. A method of manufacturing a stator of a rotating electrical machine that includes electromagnetic steel plates which are laminated in an axial direction of a stator iron core to form the stator iron core; spacing strips which are disposed to be interposed in the electromagnetic steel plates for each predetermined set of plates of the electromagnetic steel plates, each of the spacing strips extending in a radial direction of the stator iron core to form ventilation ducts; a spacing strip attachment plate which is disposed between the spacing strips and the set of plates of the electromagnetic steel plates to fix the spacing strips, the method comprising:
forming an insulating layer which covers an entirety of exposed surfaces of the spacing strip attachment plate and the spacing strips fixed to the spacing strip attachment plate,
wherein the forming the insulating layer includes forming the insulating layer by executing insulation treatment, in a state in which the spacing strips have been fixed to the spacing strip attachment plate, to form an insulating film on entire exposed surfaces of the spacing strip attachment plate and the spacing strips fixed to the spacing strip attachment plate.

* * * * *